United States Patent [19]
Ofer

[11] Patent Number: 5,935,260
[45] Date of Patent: Aug. 10, 1999

[54] METHOD AND APPARATUS FOR PROVIDING SYSTEM LEVEL ERRORS IN A LARGE DISK ARRAY STORAGE SYSTEM

[75] Inventor: Erez Ofer, Brookline, Mass.

[73] Assignee: EMC Corporation, Hopkinton, Mass.

[21] Appl. No.: 08/850,878

[22] Filed: May 2, 1997

[51] Int. Cl.⁶ .................................................. G06F 11/00
[52] U.S. Cl. ............................................................ 714/42
[58] Field of Search ..................... 395/183.18, 182.03, 395/183.07, 183.19, 183.2, 183.21, 185.01, 185.07, 183.17, 185.05, 835, 839, 840, 182.04, 182.06, 182.07; 371/40.15, 40.13

[56] References Cited

U.S. PATENT DOCUMENTS

| | | | |
|---|---|---|---|
| 5,357,473 | 10/1994 | Mizuno et al. | 365/201 |
| 5,361,346 | 11/1994 | Panesar et al. | 395/575 |
| 5,488,702 | 1/1996 | Byers et al. | 395/186 |
| 5,574,736 | 11/1996 | Bandy | 371/40.4 |
| 5,574,855 | 11/1996 | Rosich et al. | 395/183.17 |
| 5,574,856 | 11/1996 | Morgan et al. | 395/185.05 |
| 5,615,335 | 3/1997 | Onffroy et al. | 395/183.06 |
| 5,619,644 | 4/1997 | Crockett et al. | 395/183.21 |
| 5,644,705 | 7/1997 | Stanley | 395/183.18 |
| 5,717,850 | 2/1998 | Apperley et al. | 395/182.04 |

*Primary Examiner*—Robert W. Beausoliel, Jr.
*Assistant Examiner*—Nadeem Iqbal
*Attorney, Agent, or Firm*—John M. Gunther, Esq.; Leanne J. Fitzgerald, Esq.

[57] ABSTRACT

A method of providing error to a host computer coupled to a storage system is provided. The method includes modifying a command in the storage system/computer communications protocol. The command, when received by a controller within the storage system is interpreted as being a modified command. The controller is responsive to the modified command for reading error information from its stored location within the storage system. The error information is then returned to the requesting host computer. Thus, previously unavailable error information is made available host computers coupled to the storage system without the need to add commands to the standard communications protocol.

6 Claims, 3 Drawing Sheets

| BYTES/BITS | BIT 7 | BIT 6 | BIT 5 | BIT 4 | BIT 3 | BIT 2 | BIT 1 | BIT 0 |
|---|---|---|---|---|---|---|---|---|
| BYTE 0 | COMMAND CODE - $4D ||||||||
| BYTE 1 | 00 ||||||||
| BYTE 2 | PAGE CODE ||||||||
| BYTE 3 | 00 ||||||||
| BYTE 4 | 00 ||||||||
| BYTE 5 | SUB PAGE PARAMETER ||||||||
| BYTE 6 | SUB PAGE ||||||||
| BYTES 7-8 | ALLOCATION LENGTH ||||||||
| BYTE 9 | CONTROL BYTE - 00 ||||||||

FIG. 3

METHOD AND APPARATUS FOR PROVIDING SYSTEM LEVEL ERRORS IN A LARGE DISK ARRAY STORAGE SYSTEM

BACKGROUND OF THE INVENTION

This invention relates generally to storage systems associated with computer systems and more particularly to providing a method and apparatus providing error information relevant to an entire storage system.

As it is known in the art, computer systems generally include a central processing unit, a memory subsystem and a storage subsystem. The storage subsystem associated with or in addition to a local computer system may include a large number of independent storage devices or disks housed in a single enclosure. This array of storage devices is typically connected to several computers (or hosts) via dedicated cabling or via a network. Such a model allows for the centralization of data which is to be shared among many users and also allows a single point of maintenance for the storage functions associated with the many computer systems.

One type of storage system known in the art is one which includes a number of disk storage devices configured as an array (sometimes referred to as RAID). Such a system may include several arrays of storage devices. In addition to the arrays of storage devices, typical storage systems include several types of controllers for controlling the various aspects of the data transfers associated with the storage system. One type of controller is a host controller and provides the interface between the host computers and the storage system. The host controller typically provides the interface between a host computer and the storage system. Another type of controller is a disk controller. There may be one or more disk controllers for each array of storage devices in a storage system. The function of a disk controller is to manage the transfer of data to and from its associated array drives.

In addition to the controllers described above, advanced storage systems, such as the SYMMETRIX® storage systems manufactured by EMC Corporation, may include a very large memory which is coupled to each of the controllers in the system. The memory may be used as a staging area (or cache) for the data transfers between the storage devices and the host computers and may provide a communications path between the various controllers. Such systems provide superior performance to non-cache storage systems. In addition basic functional blocks described above, a storage system will typically include other components such as an enclosure, power supplies, cooling fans, service processors, communications equipment, etc.

The storage systems described above may be cabable of servicing requests from different types of host computers, i.e. mainframe an open system computers. The communications path between the open system type computeres is one which typically adheres to the Small Computer System Interface (SCSI) communication protocol. That is, communications between the open system computers and the storage system occurs using a set of commands which are defined in the protocol. For example, in order for a host computer to read data from the storage system, it will typically send specific SCSI commands to its associated host controller within the storage system. The host controller interprets the commands and causes the appropriate disk controllers to retrieve the data from the corresponding disk devices. Information returned by the disk devices is also defined by the SCSI protocol. In addition to the commands for read and write operations, the SCSI protocol defines a means for the single disk devices to report error conditions. However, these error conditions are, in most cases, specifically related to the input/output (I/O) operation taking place when the error occurs.

In storage systems with large disk arrays, like the SYMMETRIX® storage systems described above, a need arises to be able to report error messages which are related to the entire system, or to report individual device errors which are not related to an immediately occurring I/O. Examples of these errors are, controller errors, power failures, cooling fan failures, communications errors, etc. These error reports need to be made available to any one of the host systems attached to the storage system even if the error does not effect the host seeking the information. The error reports would be useful to, for example, application programs running on the host computer which monitor the status of the storage system. The present SCSI protocol does not provide a command in its command set which allows a host computer to retrieve this type of error information.

SUMMARY OF THE INVENTION

In accordance with the present invention a storage system is provided which includes at least one host controller that serves as an interface between a host computer and the storage system. The host controller is responsive to a first set of commands (for example the SCSI command set) for performing a corresponding first set of operations. The first set of operations may include those tasks necessary to effectuate the reading and writing of data to a storage device within the storage system. The storage system further includes a memory which is accessible by the controller and is useful for temporarily storing data transferred to and from the host computer. The memory is also used to store error information associated with various components of the storage system. Generally, the error information is not normally available for reading by the host computer using the commands included in the first command set. That is, a host computer would not be able to transmit any one of the commands in its standard form to the host controller and expect to have the error information stored in the memory returned as a return value. The host controller within the storage system includes a command processor for receiving and executing commands as they are received from the host. The command processor is further responsive to receipt of a modified command, from the first command set, for retrieving the error information stored in the memory and transmitting it back to the host which issued the command. To achieve this access, the host controller recognizes that a specialized version of one of the commands has been received. In order to recognize the modified command, the command processor is programmed to examine certain parameters of the received command and to determine if the command includes the special parameters which define the special memory access. If the command includes those parameters, the special command is executed. Otherwise, the standard operation associated with the command is performed. With such an arrangement, a standard set of commands may be utilized to perform a non-standard memory access operation for the purpose of retrieving previously unavailable error information.

BRIEF DESCRIPTION OF THE DRAWINGS

The above and further advantages of the present invention may be better understood by referring to the following description taken into conjunction with the accompanying drawings in which:

FIG. 3 is an illustration of the SCSI log sense command as modified and used according to a preferred embodiment of the present invention in order to implement error reporting.

DETAILED DESCRIPTION OF THE PREFERRED EMBODIMENT

Figure 1:
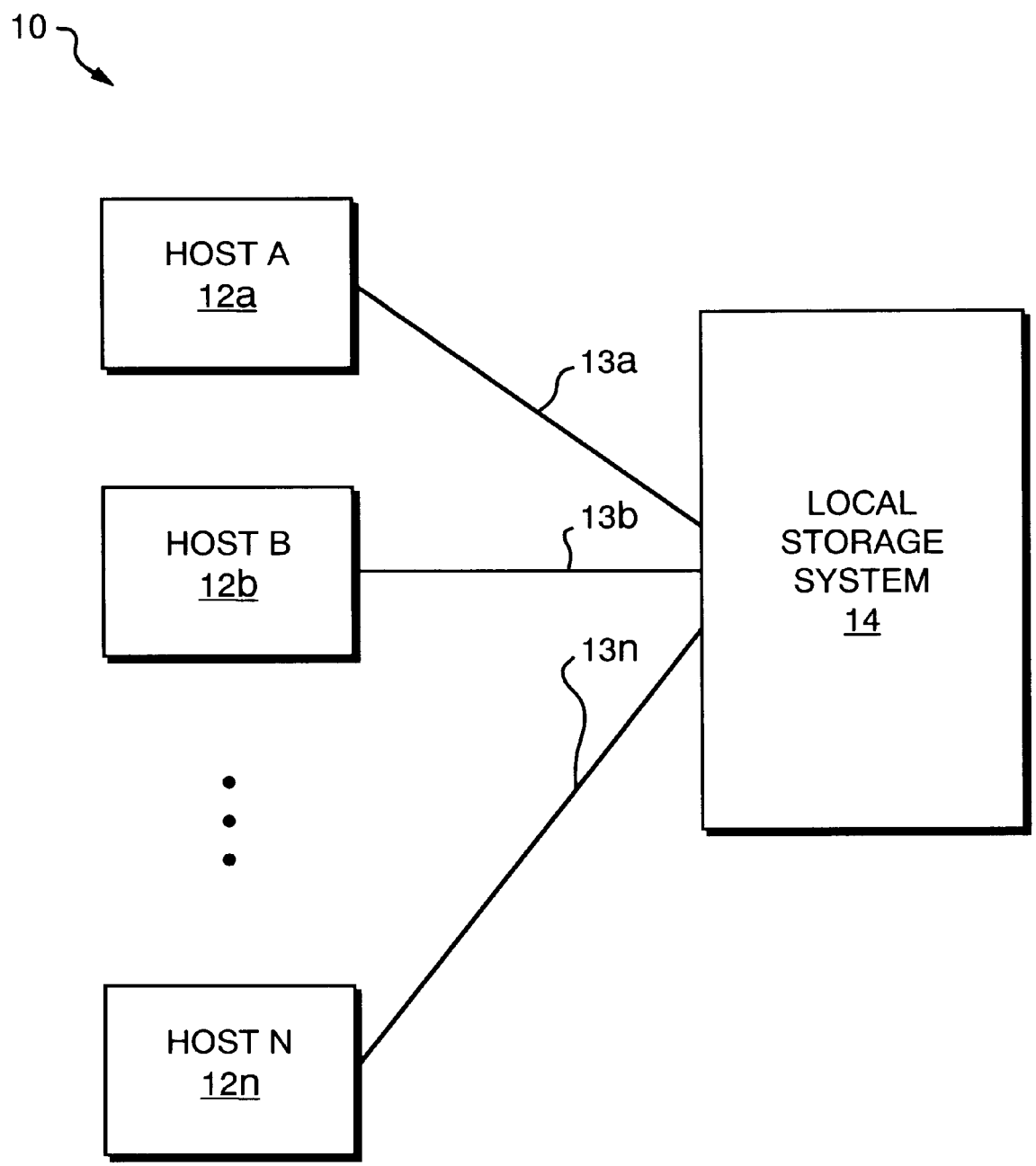
FIG. 1 is a block diagram of a computer system including a mass storage system.

Referring now to FIG. 1, computer system 10 is shown to include, among other things, a plurality of host computers 12a–12n, coupled to a storage system 14 via communication paths or busses 13a–13n respectively. The host computers may each be any of a well-known type of computer system. For example, host 12a may be a mainframe computer or may be an open-systems computer or alternatively may be a personal computer. Since each of the computer systems just mentioned typically communicates using a specific communication protocol buses 13a–13n will correspondingly be those buses specific to the computer system to which they are coupled. That is for example, assuming host 12b is an open-systems type computer system (e.g. running the UNIX Operating System) bus or communication path 13b would typically be a SCSI type communications path or a fiber-channel communications path. All communications over bus 13b would therefore adhere to the SCSI or fiber-channel communications protocol respectively.

Figure 2:
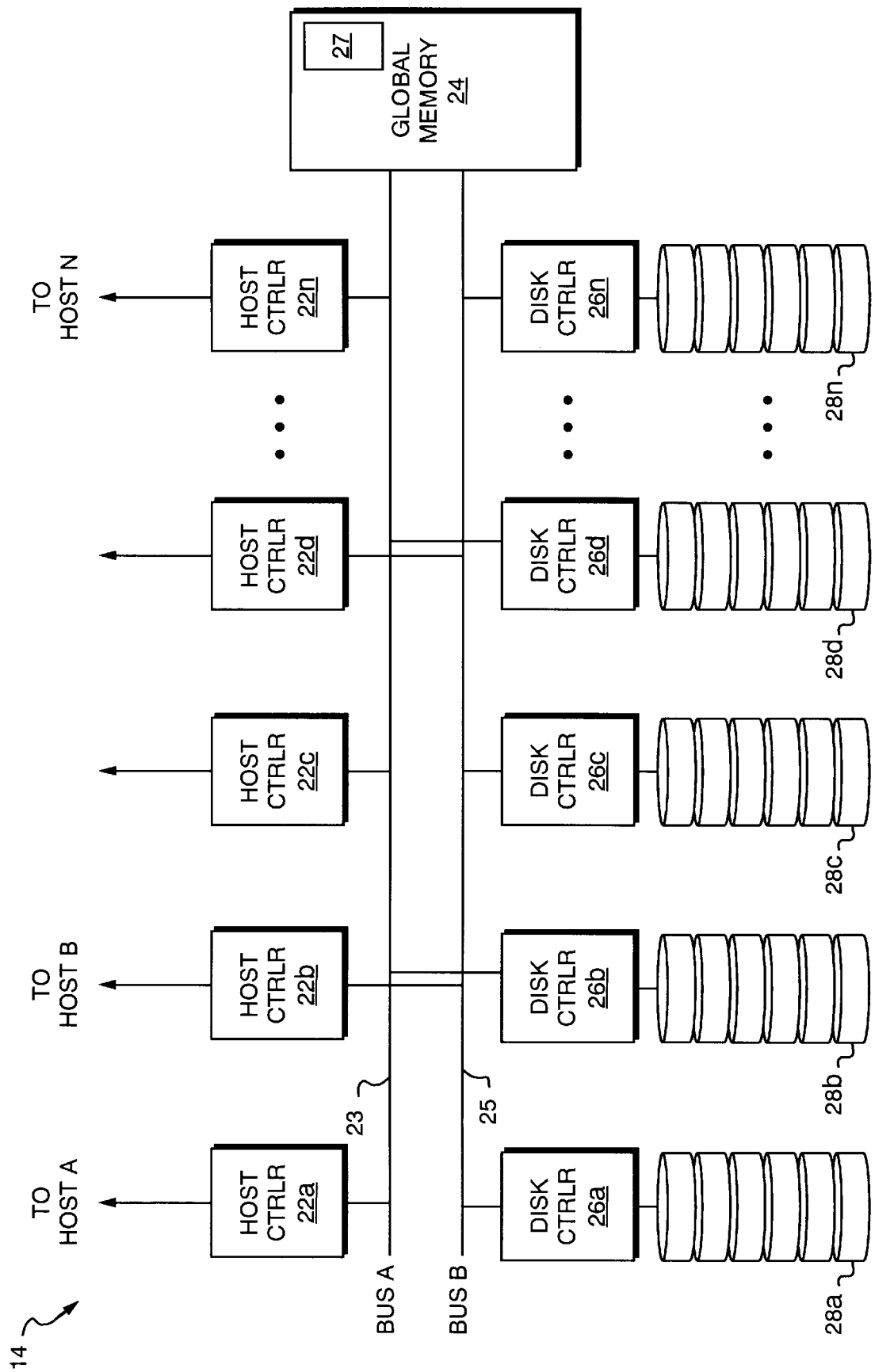
FIG. 2 is a diagrammatic representation of the storage system of FIG. 1

The storage system 14 of computer system 10 may be a mass storage system which, as will be described in more detail below, includes several individual components coupled via an internal communications path. The communications path may include one or more buses. Referring now to FIG. 2 the storage system 14 of FIG. 1 is shown in more detail. Here the storage system includes a plurality of host controllers 22a–22n which are, according to a preferred embodiment of the present invention, coupled alternately to buses 23 and 25. Each host controller 22a–22n is responsible for managing the communication between its associated attached host computer and storage system 14. Also coupled alternately to buses 23 and 25 are a plurality of disk controllers 26a–26n. Coupled to each disk controller is an array of storage devices which as shown here may be magnetic disk devices. Similar to the host controllers described above, each disk controller is responsible for managing the communications between its associated array of disk drives and the host controllers or memory 24 of storage system 14.

Also coupled to both buses 23 and 25 is global memory 24. According to a preferred embodiment of the present invention, global memory 24 serves as a very large cache which is used during the transfer of data between the host computers and the disks of disk arrays 28a–28n. During operation, a host may desire to read data from or write data to one of the disk arrays contained within the storage system 14. In order to do so, the host computer would send a request over its associated bus (for example bus 13a) to the controller attached to that bus (here controller 22a). The controller, once it receives the request from the host computer, then begins performing those tasks necessary to satisfy the request from the host. For example, if the request by the host was to write some portion of data to one of the disks in any of disk arrays 28a–28n, the host controller receiving the request would begin writing the data received from the host to the global memory 24. Once all of the data was written to global memory 24, the host controller may send an acknowledge signal back to the host computer indicating that the data was received. Sometime thereafter one of the disk controllers 26a–26n, depending on the target disk array, will begin reading the data from the global memory and writing it to the associated target disk device.

Alternately, if the request received from the host computer was to read data from one of the disk arrays 28a–28n, the host controller would first look to the global memory 24 to determine if the data was already resident in the global memory (as may be the case if a previous read was performed for the same data). If the data is resident in the global memory, this would be known as a cache hit and the host controller would begin reading the data from the global memory and delivering it to the host. On the other hand, if the data was not resident in global memory, this would be considered a cache miss and the associated disk controller would then begin reading the data from the corresponding disk device of the host request. The data read from the disk device would be placed into the global memory 24. The host controller would then read the data from the global memory 24 and deliver it to the requesting host computer.

In addition to the components described above, storage system 14 may typically include other components (not shown). These components may include power supplies, enclosures, cooling fans, and service processors, etc. Each of these component may have a vital role in the operation of storage system 14. Thus, monitoring these components in addition to the controllers and disk devices described above to detect operational errors is necessary. According to a preferred embodiment of the present invention, error information about any of the components within storage system 14 may be stored in an error log 27 within the global memory 24. By storing the information in global memory 24, the information would generally not be accessible to a host computer connected to storage system 14 via a SCSI communications channel. That is, there is no command in the SCSI command set which provides for reading the global memory 24. The only error information available via the SCSI command set is error information relating to a particular storage device. That error information is typically associated with a particular I/O operation and is stored in a local buffer within the storage device. As such, the error information is only available to the host computer which "owns" that device and is limited to device specific errors. A host desiring to read the device specific information would issue the SCSI Request Sense command in a manner well known in the art.

In accordance with the present invention, host controllers within storage system 14 are responsive to an extension of the SCSI Log Sense command for accessing error log 27 and providing system level error detection by attached hosts. According to a preferred embodiment, each host controller within storage system 14 is capable of receiving and responding to the modified SCSI Log Sense command in order to access error log 27. Since error log 27 includes error information about the entire storage system, each host connected to the system may learn of any errors occurring within the storage system, even errors regarding controllers which are not associated with the host issuing the modified Log Sense command.

Referring now to FIG. 3, the modified Log Sense command 30 of the present invention is shown to include ten bytes of command information. Byte 0 of the command is the command code. Here the code is $4D and is used by a host computer to send a Log Sense command to the storage system. The recipient host controller interprets the command 4D to mean that it will be executing a Log Sense command. As used in the present invention, bytes 1, 3, and 4 have no meaning to the host controller when the controller interprets the contents of byte 2 and determines that a modified version of the Log Sense command is to be executed. Byte 2 of command 30 is used to indicate a so called page code. The range of values for the page code is here 10 to 3F. Each page code in the range of page codes indicates a group of specific information which may be gathered from the storage system using the modified Log Sense command. According to the preferred embodiment, a page code value of 10 indicates that the host controller will be performing those operations necessary to perform error retrieval functions.

The remaining bytes of command 30 specify particular variants of error retrieval functions available via the modified Log Sense command. Byte 6 is used to specify a particular sub-page within page code 10. According to the preferred embodiment, there are two sub-page codes. There may however be any number of sub-page codes. The number is only limited by the different types of information which one may wish to retrieve from the global memory. Here, each sub-page defines a particular type of error report. The first available sub-page code is the value 01 and is used to instruct the host controller to returnthe latest error for each disk controller within storage system 14. The second sub-page code is the value 02 and is used to instruct a host controller to provide the last sixty four errors for a particular disk controller.

To provide further flexibility as to the error reports provided by a host controller of storage system 14, each sub-page code has associated therewith sub-page parameters. The sub-page parameters are defined by values entered in byte 5 of the modified Log Sense command 30. For sub-page code 01 the sub-page parameter includes a time range value. According to the preferred embodiment, the time range value should be in the range of 01–FF (hex) and defines the number of ten second intervals during which to check for errors. That is, it instructs a host controller receiving the command to return the latest error found for each disk controller which occurred during the preceding time interval expressed as a multiple of ten seconds. As an example, consider a Log Sense command as shown below:

| Byte | Meaning (8 bits) |
|---|---|
| 0 | $4D |
| 1 | 00 |
| 2 | 10 |
| 3 | 00 |
| 4 | 00 |
| 5 | 09 (Time Window = 90 sec) |
| 6 | 01 |
| 7 | Length (high order bits) |
| 8 | Length (low order bits) |
| 9 | Control |

Here the command includes the Log Sense Command code in byte 0. Additionally, the page code value is shown to be 10 which according to the preferred embodiment indicates a request for error data from the error log 27. Byte 6 contains the sub-page value 01 which indicates a request for the latest error for each disk controller within the storage system. The sub-page parameter is here shown to be the value 09. This indicates to the controller that it should look to the error log and return the latest recorded error for each disk controller in the system, if there was an error which occurred within the last ninety seconds (i.e. the last nine, ten second intervals). The allocation length (bytes 7–8) specifies the amount of storage required for the data returned from the host controller. In the preferred embodiment, the allocation length value should be at least 220 hex.

In response to receipt of the command above, the host controller will read the error log and return information to the requesting host in the format shown below:

| Bytes | Meaning |
|---|---|
| 0–F | Standard Storage System Log Header |
| 10–1F | Specific Page (10/01) Header |
| 20–3F | Error Record for Disk Controller 1 |
| 40–5F | Error Record for Disk Controller 2 |
| 420–43F | Error Record for Disk Controller 32 |

According to the preferred embodiment, bytes 0 through 1F include two separate headers. The Standard Storage System Header, which will be discussed in more detail below, includes information which may be used by the host computer to identify the particular data format to expect. This is useful since data formats my change from time to time to allow for expansion of the error reporting capabilities of the storage system. The Standard Storage System Header according to the preferred embodiment includes the following information:

| Byte | Meaning |
|---|---|
| 00 | Page Code |
| 01 | Sub-page Code |
| 02–03 | Maximum Length |
| 04 | Flags |
| 05 | Code Date: Month |
| 06 | Code Date: Day |
| 07 | Code Date: Year |
| 08–09 | Code Revision |

-continued

| Byte | Meaning |
|---|---|
| 10–11 | MTPF Level |
| 12–15 | Code Type |

Here, byte 0 and 1 indicate the page code and sub-page code of the command which caused the return of this header data. Bytes 2–3 include a value indicating the maximum length of data that this page code may return. Bytes 4–15 are here storage system specific parameters which may be useful in identifying certain aspects of storage system 14.

The Specific Page Header of the preferred embodiment includes the following information:

| Bytes | Meaning |
|---|---|
| 00–03 | Current Time Stamp |
| 04–05 | Specific Page Flags |
| 06–0F | Reserved |

Here, bytes 0–3 are used to return a time stamp of the time when the error records were read. Bytes 04–05 are system specific flags which may identify the storage system to the host computer. Bytes 06–0F are here reserved for future use.

Each error record (i.e. bytes 20–43F of the error log return record) includes the following information:

| Bytes | Meaning |
|---|---|
| 00–21 | Reserved |
| 22–23 | Error Code |
| 24–27 | Error Time & I/F indication |
| 28–31 | Reserved |

It should be noted that there should be a record for each potential controller in the storage system 14. That is for example, if storage system 14 could accommodate 32 controllers, there should be 32 error records. If there has been an error for a particular controller, then there will be associated error data in bytes 22 through 27. In particular, bytes 22–23 will include an error code indicating the particular error which occurred with respect to the particular controller. Bytes 24–27 include a time value which indicates when the particular error occurred as well as an interface (I/F) indication. The I/F indication identifies a particular interface or port of the controller where the error occurred. This value is useful since, according to the preferred embodiment, each controller includes four interface ports. Providing the ability to identify the port which experienced an error gives an improved level of diagnostic capabilities. If there is no error associated with a particular controller, the error record will simply contain a value of zero.

The second type of error report (or sub-page) is one which provides a history of the previous errors occurring with respect to a particular controller over a given time period. The format of the command is similar to that as shown in FIG. 3 and is shown below:

| Byte | Meaning (8 bits) |
|---|---|
| 0 | $4D |
| 1 | 00 |
| 2 | 10 |

-continued

| Byte | Meaning (8 bits) |
|---|---|
| 3 | 00 |
| 4 | 00 |
| 5 | 03 Controller number (hex) |
| 6 | 02 |
| 7 | Length (high order bits) |
| 8 | Length (low order bits) |
| 9 | Control |

Here byte 6 contains the value 02 which indicates a sub-page 02. When a controller of storage system 14 receives the command above, it will interpret the sub-page value (02) as indicating that an error report showing the last 64 errors for a particular controller (as identified in byte 5) should be returned. Thus for the command shown above, the controller would read the error log and return the last 64 errors for controller number three. The other fields of the command are the same as described above for the sub-page 10 command. To accommodate the error records of the preferred embodiment, the length value specified in bytes 7 and 8 should be at least 840 (hex)

Data returned in response to the above command also has the same format as described above for the sub-page 10 command. The only difference being the actual size of the return record. That is, the error record will return up to 64 error records (i.e. from 0 to 64 errors) and thus the size of the error report will be dependent on the number of errors experienced by the controller identified in the request.

It can be seen then that a traditional SCSI command may be overloaded (i.e. modified) in order to provide error reporting functionality which is not available through the use of any commands in the SCSI command set. By provding additional funtionality within the host controllers of a storage system, the additional error reporting capability is achieved without modifying the communications protocol and thus the command is in compliance with the SCSI standard. It should be noted that the particular format of the data records described above are particular to the preferred embodiment and thus should not be seen as a limitation to the present invention. Other record formats may be used and other error reports may be generated utilizing the concepts of the present invention.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A storage system comprising:
   at least one host controller for providing an interface between a host computer and said storage system, said host controller responsive to a first set of commands for performing a corresponding first set of operations;
   a memory accessible by said at least one controller, said memory operable to temporarily store data transferred to and from said host computer and further operable to store error information relevant to said storage system wherein said error information is not accessible to said host computer via said host controller executing any one of said first set of commands;
   a command processor within said host controller for receiving and, depending on which of said commands is received, performing a corresponding one of said first set of operations, said command processor further responsive to receipt of a modified one of said first set of commands for performing an operation which is not one of said first set of operations.

2. The storage system of claim 1 wherein said operation which is not one of said first set of operations allows said host computer, via said host controller, to access said error information stored in said memory.

3. The storage system of claim 1 wherein said modified one of said first set of commands includes one of said first set of commands having additional parameter information which, when interpreted by said command processor, instructs said command processor to read said error information stored in said memory and transmit it to said host computer.

4. A method of operating a storage system comprising the steps of:

receiving a command by a host controller within said storage system;

parsing said command to determine if said command is one of an expected set of commands or if said command is a modified one of said set of commands;

if said command is not said modified one of said set of commands, executing an operation associated with said command;

otherwise if said command is said modified one of said set of commands, executing a second different operation than that associated with a non-modified version of said modified command.

5. The method according to claim 4 wherein said set of commands are commands included within the small computer systems interface (SCSI) protocol and wherein said SCSI protocol includes a log sense command for retrieving information from individual disk drives of said storage system and wherein said modified command is said log sense command with additional information embedded therein.

6. The method according to claim 5 wherein said host controller, in response to receipt of said modified command, reads error information stored in a global memory of said storage system and transmits said information to a host which transmitted said modified command to said storage system.

* * * * *